United States Patent [19]

Balla

[11] 4,264,668

[45] Apr. 28, 1981

[54] LAMINATED MATERIAL COMPRISING AN OUTER SEALING LAYER OF THERMOPLASTIC MATERIAL

[75] Inventor: Gyula Balla, Malmö, Sweden

[73] Assignee: Tetra Pak International AB, Lund, Sweden

[21] Appl. No.: 50,201

[22] Filed: Jun. 20, 1979

[30] Foreign Application Priority Data

Jun. 26, 1978 [SE] Sweden ............................. 7807200

[51] Int. Cl.³ .............................................. B32B 3/00
[52] U.S. Cl. ................................... 428/195; 156/275; 428/198; 428/200; 428/201; 428/204; 428/206; 428/211; 428/408; 428/537; 428/913; 428/688
[58] Field of Search ............... 428/195, 200, 201, 204, 428/206, 211, 408, 537, 538, 913, 198; 156/275

[56] References Cited

U.S. PATENT DOCUMENTS

| | | | |
|---|---|---|---|
| 3,567,546 | 3/1971 | Morris | 156/275 |
| 3,574,031 | 4/1971 | Heller | 156/275 |
| 3,657,038 | 4/1972 | Lightfoot | 156/275 |
| 3,679,534 | 7/1972 | Weinberg | 156/275 |
| 3,865,626 | 2/1975 | Diener | 428/408 |
| 4,103,066 | 7/1978 | Brooks | 428/408 |
| 4,110,506 | 8/1978 | Cottingham | 428/200 |

*Primary Examiner*—Marion McCamish
*Attorney, Agent, or Firm*—Burns, Doane, Swecker & Mathis

[57] ABSTRACT

A sealable laminated material which consists of an outer thermoplastic layer with a lamination layer arranged adjoining the said layer containing fine-grain carbon material, so-called carbon black, and a binder. The laminated material moreover may contain a carrier layer of e.g. paper, cardboard or plastic material. The outer thermoplastic layer of the laminated material which is intended to act as a sealing layer, can be heated up to sealing temperature in that heat is generated in the adjoining layer containing powdered coal when the latter is subjected to the effect of a high-frequency electric field.

15 Claims, 2 Drawing Figures

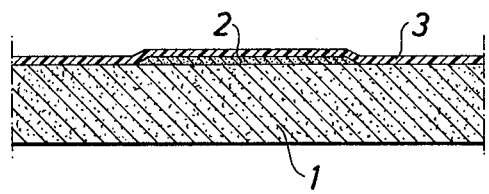
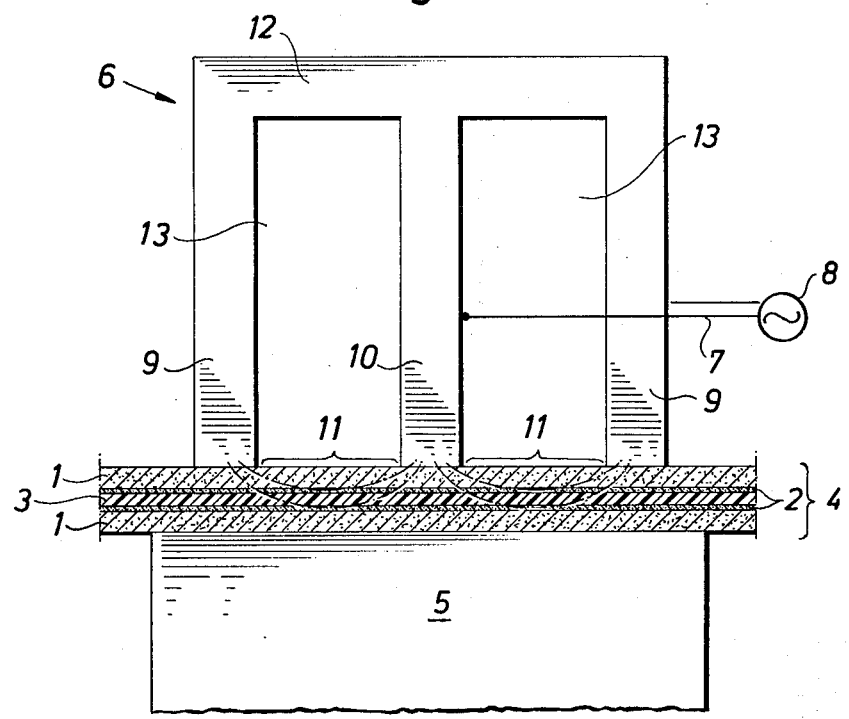

LAMINATED MATERIAL COMPRISING AN OUTER SEALING LAYER OF THERMOPLASTIC MATERIAL

The present invention relates to a laminated material comprising an outer thermoplastic layer and a second layer arranged adjoining the said thermoplastic layer, which second layer is adapted so that it can be heated by means of a high-frequency electric field and transmits by convection the heat generated in the said second layer to the said thermoplastic layer.

In packaging technique a laminated material is used frequently comprising thermoplastic sealing layers which can be joined together by heating with simultaneous compression. Such seals will be both firm and impermeable, since the sealing layers, which usually are constituted of thermoplastic material, are joined together by fusion. A problem in the realisation of the said seals is that the sealing period must be kept very short, and is preferably less than 200 ms, which means that the sealing layers must be heated very rapidly to their sealing temperature, which for the usual thermoplastic material such as polyethylene is approx. 130°–150° C.

Conventional sealing systems, where the heat is supplied by means of convection from hot surfaces, are generally not sufficiently quick, especially not for the sealing of laminated material, where the heat first has to be transmitted through a carrier layer which may consist of a relatively thick layer of paper or cardboard. It is known that rapid seals can be achieved with the help of a high-frequency magnetic field generated in a coil which is preferably arranged in a pressure pad, but in this method it is a prerequisite that the packing material contains a layer of a material with very good electric conductivity e.g. metal foil. The metal foil used is in general aluminium foil which can be rolled very thin, and, as mentioned above, it is possible to achieve very rapid and selective seals in laminates containing an aluminium foil layer which is placed adjoining the thermoplastic sealing layer by generating heat in the aluminium foil layer when the same is exposed to a concentrated electromagnetic field.

The disadvantage of this method is that the packing material becomes expensive, since for one thing the aluminium foil layer is expensive, and for another the lamination process is more complicated than if plastic material is laminated directly to paper or some other carrier layer. These disadvantages are overcome, however, by using a method in accordance with the present invention, which is characterized in that the said second layer which is arranged adjoining the thermoplastic sealing layer, comprises finely-divided carbon material, in particular so-called carbon black. The invention is further characterized in that the carbon black is bonded by a binder, that the resistivity of the carbon black is less than 6 ohm-cm and that the resistivity is preferably within the range 0.1–1.0 ohm-cm. A laminated material in accordance with the invention and a method for sealing the said laminated material will be described in the following with reference to the attached drawing, wherein FIG. 1 shows a cross-section through a packing laminate, and FIG. 2 shows a cross-section of a sealing device which is made to act upon two layers of packing material placed against one another with the intention of joining them together in accordance with the method of the invention.

It is a prerequisite of the invention that the material wherein it is intended to generate the amount of heat required for the sealing operation can be selectively applied to the packing material by means of a printing process, so that the said layer can be located with great accuracy in the area along the packing material where a sealing joint is required.

Tests have been made with a number of different conducting materials and it has been found that satisfactory results could only be obtained with powdered coal, and in particular with the type of powdered coal which is marketed under the name of carbon black. Technically speaking carbon black is soot which is obtained on combustion of various hydrocarbons, the size and composition of the carbon black particles being influenced by different methods of preparation. By and large carbon black is of a graphite-like structure with plane layers of hexagonally arranged carbon atoms. Experiments have shown that the resistivity can vary between different types of carbon black, and it has been discovered that the optimum sealing result is obtained with a carbon black whose resistivity is less than 6 ohm-cm and in particular is in the range of 0.1–1.0 ohm-cm. In practical tests with laminated material containing the said powdered coal it has been found that the most effective heat generation in the layer containing the powdered coal, and hence also the optimum sealing result, is obtained if the resistance of a test strip of the laminate in question is between 1000 and 15000 ohm (preferably 6000 ohm) if the test strip is 3.5 cm long and 1 cm wide and the resistance is measured between two electrode plates at the ends of the test strip. It has also been found that the carbon black, in order to have the appropriate electrical properties, on the one hand should be fine-grain with an average grain size of less than 20 nm, on the other hand the grains should combine to relatively large aggregations and that the individual grains should be porous in their structure. It has been found that qualities of carbon black suitable for the laminated material have certain properties which can be defined as the absorption of dibutyl phthalate or the so-called DBP absorption of the carbon black material together with the so-called specific nitrogen surface area of the carbon black material, which provides a measure for the size of the individual particles, smaller particles having a higher specific surface area than larger particles. The DBP absorption is a measure for the size of aggregation of the carbon black material and it has been found that the carbon black materials suitable for the purpose has a so-called DBP-absorption which is 75–300 cm$^3$/100 g and a specific nitrogen surface area of 100–300 m$^2$/g.

The abovementioned characteristic values of the carbon black material suitable for the laminated material in accordance with the invention certainly do not provide any direct value of the electrical properties of the carbon black material, but as mentioned above, suitable electrical properties are obtained if the individual carbon black particles are small and are combined to large aggregations.

In order that the powdered coal or carbon black should be capable of being printed, it has to be mixed with a binder which on the one hard makes the powdered coal/binder mixtures applicable to a base of paper or plastics. It has been found that a suitable binder may be an aqueous plastic compound of the acrylate type, but that it is also possible to use spirit-based solvents or other types of solvents, which however, must not emit excessive smell, since the packing material frequently may be used in connection with foodstuffs.

In FIG. 1 is shown a greatly enlarged layer of a packing laminate comprising a relatively thick carrier layer 1 of paper or cardboard. On the carrier layer 1 a layer 2 of carbon black has been placed which has been applied with the help of a printing press and which layer contains a binder which bonds together the particles of powdered coal. On top of the powdered coal layer 2 and the carrier layer 1 there is a thin sealing layer 3 of a thermoplastic material, e.g. polyethylene or polypropylene.

In the laminate thus arranged the carbon black layer 2 is placed selectively along the area of packing material which is to be included in a sealing joint in the manufacture of the eventual packing container, which means that the packing material, when it is constituted of a web will generally be provided with zones of carbon black coating adapted so that they transverse the web and are arranged at a distance from one another.

The sealing of the packing material in principle may take place in the manner as shown schematically in FIG. 2, where two combined layers 4 of packing material are pressed together between a preferably insulating base 5 and a sealing device 6, which is constituted of a cavity resonator, the packing material being arranged so that a layer 2 of carbon black material in at least one of the combined material layers 4 is located directly underneath the sealing device 6. When a high-frequency electric current from a generator 8 is supplied to the sealing device 6 by means of a coaxial cable 7 a high-frequency electric field is produced between the outer walls 9 of the sealing device 6 and its centre electrode 10, which electric field is closed via the carbon black layer 2 which is momentarily heated whilst at the same time the thermal energy generated is transmitted by convection to the adjoining plastic layer 3 which it causes to melt. As the sealing layers 3 of plastics facing one another are caused to melt they will be joined together in an impermeable and reliable seal, and the sealing area is maintained pressed together by means of the sealing element 6 until the plastic material has become stabilized again owing to the heat being dissipated through the packing material to the sealing element 6 and the holding-up tool 5. The sealing joint is thus formed along two narrow parallel bands 11 which are situated substantially between the outer walls 9 of the sealing device 6 and its centre electrode 10.

As mentioned previously, the sealing device 6 is constituted of a so-called cavity resonator which in principle consists of a container bounded by the side walls 9 and the end wall 12, and which has a centrally placed electrode 10. Between the outer walls 9 and the centre electrode 10 there is a cavity 13, and the cavity resonator, which is shown in cross-section in FIG. 2, has a dimension in longitudinal direction which corresponds to the length of the required seal. The dimensions of the cavity resonator, and especially the height of the centre electrode 10 and the width of the cavity 13, determine the so-called resonance frequency of the resonator, the latter has to be supplied with a high-frequency electric current, whose frequency corresponds to the resonance frequency of the resonator. In principle the resonator can be fed in different ways, and in the case shown here the feed takes place via a coaxial cable 7 whose central wire is joined to the centre electrode 10 whilst the screen of the coaxial cable is joined to the outer walls 9.

When a high-frequency electric current is fed to the resonator, an electric field will be formed between the bottom part of the outer walls 9 and the centre electrode 10, which electric field when an electrically conducting material is placed in front of the resonator, will be closed via the electrically conducting layer of said material. In the case when the electrically conducting layer is constituted of a carbon black coating in accordance with the invention, heat will be generated in the same, probably as a combination between ohmic losses and dielectric losses occurring in the layer, whilst on the other hand the plastic and carrier layers of the packing material are not heated. The width of the carbon black layer must substantially coincide with the width of the resonator or sealing element 6, but the width is by no means critical and in practice a somewhat wider carbon black layer should be chosen, so as to prevent fitting problems when the carbon black layer is placed underneath the sealing element 6. To obtain suitable dimensions of the resonator the same is fed as a rule with a frequency of between 100 and 500 MHz, but it is possible to achieve sealing effects also if the frequency of feed is considerably lower. However, for practical reasons the frequency should exceed approx. 100 kHz.

As mentioned previously, it has been established that a layer containing carbon black which can be activated ought to have a resistivity corresponding to the resistivity of a similar powdered coal coating which is 3.5 cm long and 1 cm wide and which has a resistance measured by means of direct current of approx. 6000 ohm. This means that it may become necessary to print several layers of carbon black on top of one another in order to obtain the appropriate resistivity in the layer to be activated, and the number of imprinted layers may vary with the quality of the carbon black and the composition of the binder.

The physical basis of the heating up of the carbon black layer which is to be activated has not been fully explained, and the heat in the carbon black layer is probably generated as purely resistive losses. Investigations have shown that it is not necessary for the current to be conducted via the aggregations of chains of carbon black particles which are present in the layer, but that the conducting may also take place by the so-called tunnel effect, which gives rise to an inner field emission, when the electrons can pass normally unsurmountable barriers, so that a current can flow through the layer.

It has been found that with the method in accordance with the invention it is possible to produce durable sealing joints in a very short time (less than 150 ms for heating of the plastic layer from room temperatures to 130°–150° C.), and the method is moreover energy-saving, since the heat is generated just where it is required and the dissipation losses are small. The greatest advantage is, of course, that it is possible with the method in accordance with the invention to apply a rapid and reliable sealing process to an inexpensive packing material which does not contain any metal foil layer.

In the embodiment described above it has been assumed that the carbon black layer is applied selectively along the surfaces where the sealing is to be carried out, but it is also possible to coat the whole surface of the laminate with carbon black layer in cases where it is desired to heat the whole laminate, e.g. in connection with heat generation, lamination operations or shrink-forming operations.

I claim:

1. A sealed, laminated material comprising:

a first sealing layer of thermoplastic material;

a second sealing layer of thermoplastic material having one side immediately adjacent one side of said first layer of thermoplastic material; and a first layer containing a first region of carbon black arranged adjoining the other side of said first sealing layer of thermoplastic material, said first layer containing said first region of carbon black being heatable by a high-frequency electric field, and able to transmit by convection the heat generated in the said first layer containing said first region of carbon black to the said first and second sealing layers of thermoplastic material, the said first and second sealing layers being sealed together at least in the first region of carbon black.

2. A sealed, laminated material in accordance with claim 1, further comprising:

a first carrier layer of one of the group consisting of paper, cardboard and plastic material, said first layer containing carbon black being arranged between said first carrier layer and said first sealing layer of thermoplastic material.

3. A sealed, laminated material in accordance with claim 1, wherein the first layer containing the first region of carbon black further contains binder.

4. A sealed, laminated material in accordance with claim 3, wherein the resistivity of the carbon black is less than 6 ohm-cm.

5. A sealed, laminated material in accordance with claim 3, wherein the carbon black is fine-grained with an average grain size less than 20 nm.

6. A sealed, laminated material in accordance with claim 5, wherein the absorption of dibutyl phthalate, the so-called DBP absorption, of the carbon black is between 75 and 300 cm$^3$/100 g.

7. A sealed, laminated material in accordance with claim 5, wherein the specific surface ($N_2$ surface area) of the carbon black is between 100 and 300 m$^2$/g.

8. A sealed, laminated material in accordance with claim 3, wherein the resistivity of the carbon black is within the range 0.1–1.0 ohm-cm.

9. A sealed, laminated material in accordance with claim 3, wherein the carbon black has grains which combine to form large aggregations.

10. A sealed, laminated material in accordance with claim 3, wherein the carbon black has porous grains.

11. A sealed, laminated material in accordance with claim 1, wherein the said first layer containing the first region of carbon black is arranged selectively along preselected portions of the laminate.

12. A sealed, laminated material in accordance with claim 11, wherein the preselected portions of the laminate extend transversely over the laminate along banc-like zones, whose mutual distance corresponds to a length of the laminate utilized for producing a packing container.

13. A sealed, laminated material in accordance with claim 1, wherein the first layer containing the first region of carbon black is printed on said other side of the first sealing layer, and further wherein a number of additional layers containing carbon black and which can be actuated by a high frequency electric field are printed on top of one another so as to obtain a desired thickness of the said layers containing carbon black.

14. A sealed, laminated material in accordance with claim 1 further comprising:

a second layer containing a second region of carbon black arranged adjoining the other side of said second sealing layer of thermoplastic material, said second layer containing the second region of carbon black being heatable by a high-frequency electric field, and able to transmit by convection the heat generated in the said second layer containing the second region of carbon black to the said first and second sealing layers of thermoplastic material, the said first and second sealing layers being sealed together at least in both said first region and said second region of carbon black.

15. A sealed, laminated material in accordance with claim 14, further comprising:

a second carrier layer of one of the group consisting of paper, cardboard and plastic material, said second layer containing carbon black being arranged between said second carrier layer and said second sealing layer of thermoplastic material.

* * * * *